US012671832B2

(12) United States Patent
Robert et al.

(10) Patent No.: US 12,671,832 B2
(45) Date of Patent: Jun. 30, 2026

(54) MOTION VECTOR DETERMINATION BASED ON DATA DEPENDENCY

(71) Applicant: InterDigital VC Holdings, Inc., Wilmington, DE (US)

(72) Inventors: Antoine Robert, Mézières sur Couesnon (FR); Fabrice Leleannec, Mouazé (FR); Franck Galpin, Thorigne-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/057,356

(22) PCT Filed: May 17, 2019

(86) PCT No.: PCT/US2019/033000
§ 371 (c)(1),
(2) Date: Nov. 20, 2020

(87) PCT Pub. No.: WO2019/231724
PCT Pub. Date: Dec. 5, 2019

(65) Prior Publication Data
US 2021/0136398 A1 May 6, 2021

(30) Foreign Application Priority Data

May 28, 2018 (EP) ..................................... 18305646
Jul. 10, 2018 (EP) ..................................... 18305913

(51) Int. Cl.
*H04N 19/503* (2014.01)
*H04N 19/105* (2014.01)
(Continued)

(52) U.S. Cl.
CPC ......... *H04N 19/503* (2014.11); *H04N 19/105* (2014.11); *H04N 19/176* (2014.11); *H04N 19/189* (2014.11)

(58) Field of Classification Search
None
See application file for complete search history.

(56) References Cited

U.S. PATENT DOCUMENTS 8,374,246 B2   2/2013 Raveendran et al.
9,635,357 B2   4/2017 Zhang et al.
(Continued)

FOREIGN PATENT DOCUMENTS

CN      101189882 A      5/2008
CN      105052133 A      11/2015
(Continued)

OTHER PUBLICATIONS

Xiu et al., "CE9-related: Adressing the decoding latency issue for decoder-side motion vector refinement (DMVR)", Joint Video Experts Team (JVET) of ITU-T SG 16 WP 3 and ISO/IEC TJC 1/SC 29/WG 11, Document JVET-K0347-v2, 11th Meeting, Ljubljana, Slovenia, Jul. 10, 2018, 5 pages.

(Continued)

*Primary Examiner* — Chikaodili E Anyikire
(74) *Attorney, Agent, or Firm* — Condo Roccia Koptiw LLP

(57) ABSTRACT

A decoding method is disclosed. A flag is first decoded. The flag indicates whether a current block of a picture is decoded with a tool of a set of tools. The set of tools comprises tools using reconstructed samples of neighboring blocks decoded prior to the current block or using a block of the picture larger than a hardware unit. The flag is only decoded in the case where the current block has a parent hardware unit. A current block is then decoded responsive to the flag.

12 Claims, 12 Drawing Sheets

(51) Int. Cl.

| | |
|---|---|
| *H04N 19/176* | (2014.01) |
| *H04N 19/189* | (2014.01) |

(56) References Cited

U.S. PATENT DOCUMENTS

| | | | |
|---|---|---|---|
| 9,762,904 | B2 | 9/2017 | Chen et al. |
| 10,182,240 | B2 | 1/2019 | Hsu |
| 10,212,419 | B2 | 2/2019 | Hinz et al. |
| 10,554,965 | B2 | 2/2020 | Wang |
| 10,560,713 | B2 | 2/2020 | Lee |
| 10,701,366 | B2 * | 6/2020 | Chen .................... H04N 19/44 |
| 11,064,216 | B2 | 7/2021 | Abe et al. |
| 11,317,085 | B2 | 4/2022 | Xiu et al. |
| 11,490,114 | B1 * | 11/2022 | Kohn ................... H04N 19/433 |
| 2008/0117971 | A1 | 5/2008 | Ramachandran et al. |
| 2013/0051463 | A1 * | 2/2013 | Minoo ................... H04N 19/51 |
| | | | 375/E7.243 |
| 2013/0083853 | A1 | 4/2013 | Coban et al. |
| 2013/0163668 | A1 | 6/2013 | Chen et al. |
| 2014/0036992 | A1 | 2/2014 | Chao et al. |
| 2014/0044181 | A1 | 2/2014 | Siast et al. |
| 2015/0016520 | A1 | 1/2015 | Rapaka et al. |
| 2015/0023409 | A1 | 1/2015 | Schierl et al. |
| 2015/0085929 | A1 | 3/2015 | Chen et al. |
| 2016/0037185 | A1 | 2/2016 | Zheng |
| 2016/0286232 | A1 * | 9/2016 | Li ........................... H04N 19/52 |
| 2017/0085906 | A1 | 3/2017 | Chen et al. |
| 2017/0134726 | A1 | 5/2017 | Sim et al. |
| 2017/0339404 | A1 | 11/2017 | Panusopone et al. |
| 2017/0347102 | A1 | 11/2017 | Panusopone et al. |
| 2018/0041769 | A1 * | 2/2018 | Chuang ................. H04N 19/176 |
| 2018/0048895 | A1 | 2/2018 | Jeon et al. |
| 2018/0098087 | A1 * | 4/2018 | Li ......................... H04N 19/132 |
| 2018/0160118 | A1 | 6/2018 | Tsukuba et al. |
| 2018/0184117 | A1 | 6/2018 | Chen et al. |
| 2018/0199057 | A1 | 7/2018 | Chuang et al. |
| 2018/0249154 | A1 * | 8/2018 | Chuang ................. H04N 19/567 |
| 2018/0316929 | A1 * | 11/2018 | Li ......................... H04N 19/573 |
| 2018/0359483 | A1 * | 12/2018 | Chen .................... H04N 19/176 |
| 2019/0082192 | A1 * | 3/2019 | Chuang ................. H04N 19/577 |
| 2019/0110058 | A1 | 4/2019 | Chien et al. |
| 2019/0110064 | A1 * | 4/2019 | Zhang .................... H04N 19/54 |
| 2019/0191178 | A1 | 6/2019 | Lee |
| 2020/0027132 | A1 | 1/2020 | Segalov et al. |
| 2020/0128258 | A1 * | 4/2020 | Chen .................... H04N 19/139 |
| 2020/0137413 | A1 * | 4/2020 | Esenlik ................. H04N 19/44 |
| 2020/0186827 | A1 | 6/2020 | Abe et al. |
| 2020/0275132 | A1 | 8/2020 | Kanoh et al. |
| 2020/0374513 | A1 | 11/2020 | Xiu et al. |
| 2021/0051340 | A1 | 2/2021 | Xiu et al. |
| 2021/0051345 | A1 * | 2/2021 | Tsai ...................... H04N 19/52 |
| 2021/0076058 | A1 * | 3/2021 | Robert ................. H04N 19/577 |

FOREIGN PATENT DOCUMENTS

| | | | |
|---|---|---|---|
| CN | 105359527 | A | 2/2016 |
| CN | 106464870 | A | 2/2017 |
| CN | 107113424 | A | 8/2017 |
| JP | 2017-112416 | A | 6/2017 |
| JP | 2021-048619 | A | 3/2021 |
| JP | 2021-518059 | A | 7/2021 |
| RU | 2 573 227 | C1 | 1/2016 |
| WO | 2016/148513 | A1 | 9/2016 |
| WO | 2016/160609 | A1 | 10/2016 |
| WO | 2017/052000 | A1 | 3/2017 |
| WO | 2017/195914 | A1 | 11/2017 |
| WO | 2018/026118 | A1 | 2/2018 |
| WO | 2019065444 | A1 | 4/2019 |
| WO | 2019190907 | A1 | 10/2019 |

OTHER PUBLICATIONS

Jang et al., "Unified search range for FRUC", Joint Video Exploration Team (JVET) of ITU-T SG 16 WP 3 and ISO/IEC TJC 1/SC 29/WG 11, Document JVET-H0058, 8th Meeting : Macao, China, Oct. 18, 2017, 6 pages.

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

Horowitz et al., "Generalized Slices", Joint Collaborative Team on Video Coding (JCT-VC) of ITU-T SG 16 WP3 and ISO/IEC JTC 1/SC 29/WG 11, Document: JCTVC-Dxxx, 4th Meeting, Daegu, Korea, Jan. 20, 2011, 7 pages.

Esenlik et al., "Description of Core Experiment 9 (CE9): Decoder Side Motion Vector Derivation", Joint Video Exploration Team (JVET) of ITU-T SG 16 WP3 and ISO/IEC JTC 1/SC 29/WG 11, Document: JVET-J1029-r4, 10th Meeting, San Diego, California, US, Apr. 10, 2018, 34 pages.

English Language Translation, Japanese Patent No. 2017-112416 A, 81 pages.

Xiu et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Chen, et al., "Algorithm Description of Joint Exploration Test Model 6 (JEM 6)", JVET-F1001-V2, Editors, Joint Video Exploration Team (JVET) of ITU-T SG 16 WP 3 and ISO/IEC JTC 1/SC 29/WG 11, Hobart, AU, Mar. 31-Apr. 7, 2017, 49 pages.

Chen, et al., "Description of SDR, HDR and 360 Video Coding Technology Proposal by Qualcomm and Technicolor low and High Complexity Versions", JVET-J0021, Joint Video Exploration Team (JVET) of ITU-T SG 16 WP 3 and ISO/IEC JTC 1/SC 29/WG 11 10th Meeting, San Diego, CA, Apr. 10-20, 2018, pp. 1-43.

Li, et al., "Frame Rate Up-Conversion Based Motion Vector Derivation for Hybrid Video Coding", 2017 Data Compression Conference, Apr. 4-7, 2017, pp. 390-399.

Xiu, "On Latency Reduction for Template-Based Inter prediction" JVET-J0045_r1, Joint Video Experts Team (JVET) of ITU-T SG 16 WP 3 and ISO/IEC JTC 1/SC 29/WG 11, 10th Meeting: San Diego, CA, Apr. 2018, 6 pages.

Zhang, et al., "Planar Motion Vector Prediction", Document: JVET-J0061-v2, HiSilicon Technologies Co., Ltd, Joint Video Experts Team (JVET) of ITU-T SG 16 WP 3 and ISO/IEC JTC 1/SC 29/WG 11 10th Meeting: San Diego, US, Apr. 10-20, 2018, pp. 1-4.

\* cited by examiner

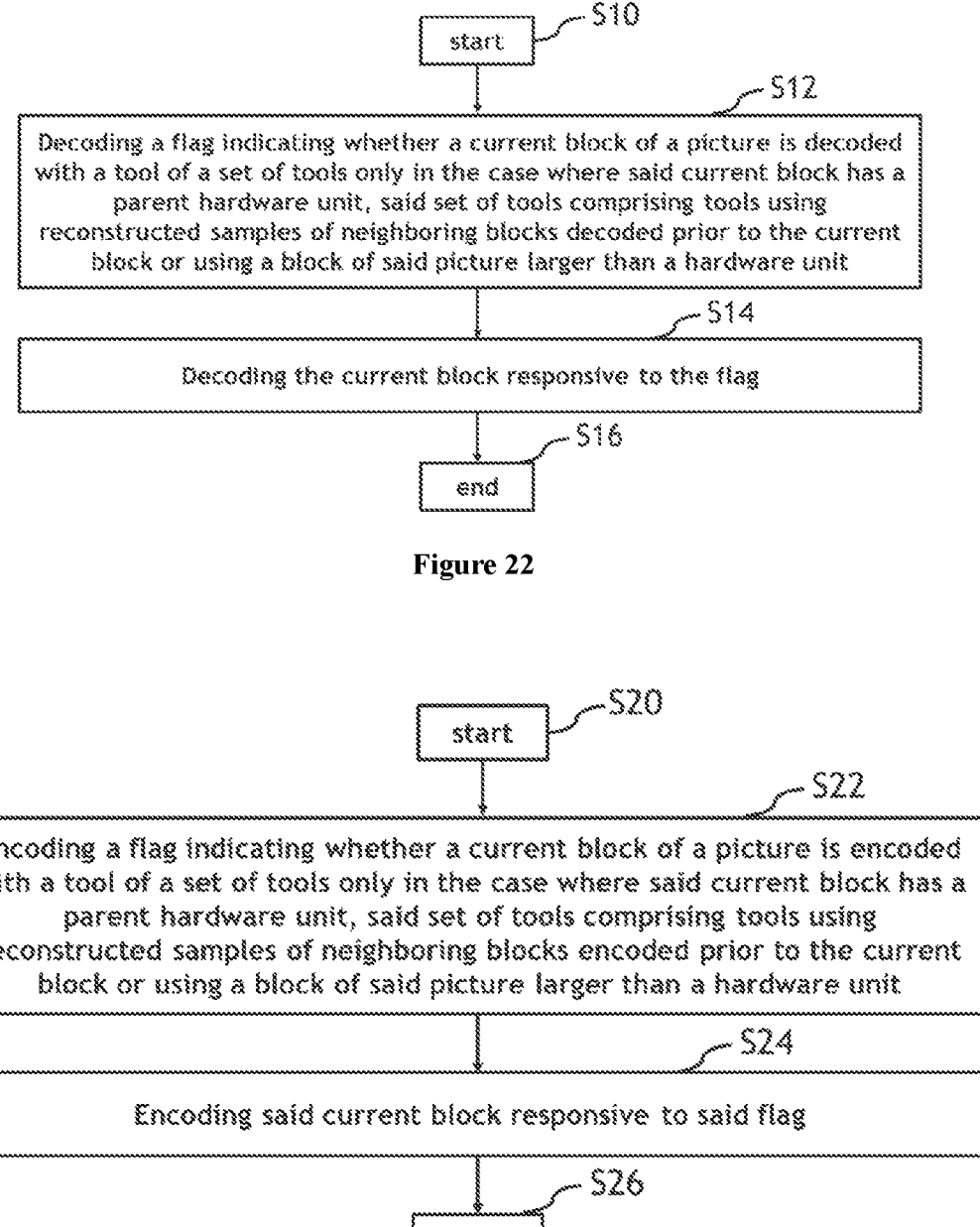

S10 start

S12

Decoding a flag indicating whether a current block of a picture is decoded with a tool of a set of tools only in the case where said current block has a parent hardware unit, said set of tools comprising tools using reconstructed samples of neighboring blocks decoded prior to the current block or using a block of said picture larger than a hardware unit

S14

Decoding the current block responsive to the flag

S16 end

Figure 22

S20 start

S22

Encoding a flag indicating whether a current block of a picture is encoded with a tool of a set of tools only in the case where said current block has a parent hardware unit, said set of tools comprising tools using reconstructed samples of neighboring blocks encoded prior to the current block or using a block of said picture larger than a hardware unit

S24

Encoding said current block responsive to said flag

S26 end

Figure 23

MOTION VECTOR DETERMINATION BASED ON DATA DEPENDENCY

CROSS REFERENCE TO RELATED APPLICATIONS

This application is the national stage entry under 35 U.S.C. § 371 of International Application PCT/US2019/033000, filed May 17, 2019 which was published in accordance with PCT Article 21(2) on Dec. 5, 2019, in English, and which claims the benefit of European Patent Application No. 18305646.4, filed May 28, 2018 and European Patent Application No. 18305913.8, filed Jul. 10, 2018.

1. TECHNICAL FIELD

The technical field of one or more implementations is generally related to video compression. The present embodiments generally relate to a method and a device for picture encoding and decoding.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

A decoding method is disclosed that comprises:
  decoding a flag indicating whether a current block of a picture is decoded with a tool of a set of tools only in the case where the current block has a parent hardware unit, the set of tools comprising tools using reconstructed samples of neighboring blocks decoded prior to the current block or using a block of the picture larger than a hardware unit; and
  decoding the current block responsive to the flag.
A decoding apparatus is disclosed that comprises at least one processor configured to perform:
  decoding a flag indicating whether a current block of a picture is decoded with a tool of a set of tools only in the case where the current block has a parent hardware unit, the set of tools comprising tools using reconstructed samples of neighboring blocks decoded prior to the current block or using a block of the picture larger than a hardware unit; and
  decoding the current block responsive to the flag.
An encoding method is disclosed that comprises:
  encoding a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
  encoding the current block responsive to the flag.

An encoding apparatus that comprises at least one processor configured to perform:
  encoding a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
  encoding the current block responsive to the flag.
A signal is disclosed that comprises:
  a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
  data representative of the current block coded responsive to the flag.
A device is disclosed that comprises:
  a decoding apparatus according to any of the embodiments disclosed; and
  at least one of (i) an antenna configured to receive a signal over the air, the signal including the video having the image, (ii) a band limiter configured to limit the received signal to a band of frequencies that includes the video having the image, or (iii) a display configured to display the output.
A computer program product is disclosed that includes instructions which, when the program is executed by one or more processors, causes the one or more processors to carry out the decoding or encoding method of any of the embodiments disclosed.

4. BRIEF SUMMARY OF THE DRAWINGS

FIG. 22 depicts a flowchart of a decoding method according to an embodiment; and FIG. 23 depicts a flowchart of an encoding method according to an embodiment.

5. DETAILED DESCRIPTION

In the HEVC video compression standard, motion compensated temporal prediction is employed to exploit the redundancy that exists between successive pictures of a video.

Figure 1:
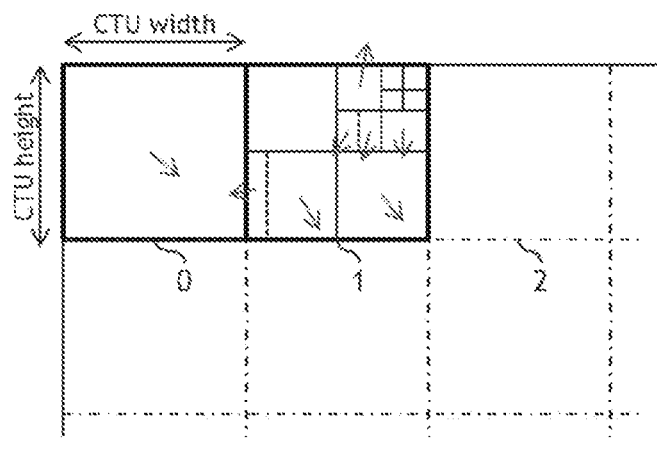
FIG. 1 represents a Coding Tree Units (CTU) divided into Coding Units (CU) in HEVC.

To do so, a motion vector is associated to each prediction unit (PU), which we introduce now. Each CTU (Coding Tree Unit) is represented by a Coding Tree in the compressed domain. This is a quad-tree division of the CTU, where each leaf is called a Coding Unit (CU), as shown in FIG. 1.

Figure 2:
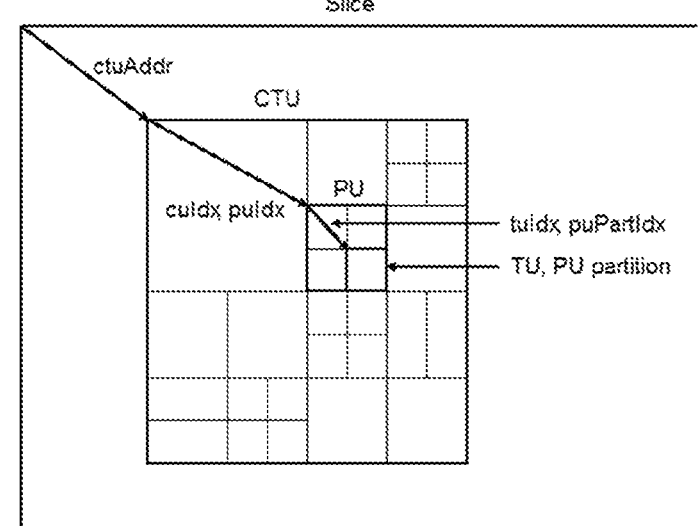
FIG. 2 represents a CTU spatially partitioned into one or more Prediction Units (PU) and Transform Units (TU) in HEVC.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as shown in FIG. 2.

A Motion Vector is assigned to each PU in HEVC. This motion vector is used for motion compensated temporal prediction of the considered PU. Therefore, in HEVC, the motion model that links a predicted block and its reference block simply consists in a translation.

In the Joint Exploration Model (JEM) developed by JVET (Joint Video Exploration Team) group, some motion models are supported to improve temporal prediction. To do so, a PU can be spatially divided into sub-PU and a model can be used to assign a dedicated motion vector to each sub-PU. In other versions of the JEM, a CU is no more divided into PU or TU, and some motion data is directly assigned to each CU. In this new codec design, a CU can be divided into sub-CU and a motion vector can be computed for each sub-CU.

For inter frame motion compensation, a set of new tools which make use of decoder side parameters estimation were developed: FRUC (Frame Rate Up Conversion) merge, FRUC bilateral and IC (Illumination Compensation).

The FRUC tool is described as follows. FRUC allows deriving motion information of a CU at decoder side without signaling. This mode is signaled at the CU level with a FRUC flag and an additional FRUC mode flag to indicate which matching cost function (bilateral or template) is to be used to derive motion information for the CU.

At encoder side, the decision on whether using FRUC merge mode for a CU is based on RD cost selection. The two matching modes (bilateral and template) are both checked for a CU. The one leading to the minimal RD cost is further compared to other coding modes. If the FRUC mode is the most efficient one, the FRUC flag is set to true for the CU and the related matching mode is used.

The motion derivation process in FRUC merge mode has two steps. A CU-level motion search is first performed, then followed by a sub-CU level motion refinement. At CU level, an initial motion vector is derived from a list of MV candidates for the whole CU based on bilateral or template matching. The candidate leading to the minimum matching cost is selected as the starting point for further CU level refinement. Then a local search based on bilateral or template matching around the starting point is performed and the MV resulting in the minimum matching cost is taken as the MV for the whole CU. Subsequently, the motion information is further refined at sub-CU level with the derived CU motion vectors as the starting point.

Figure 3:
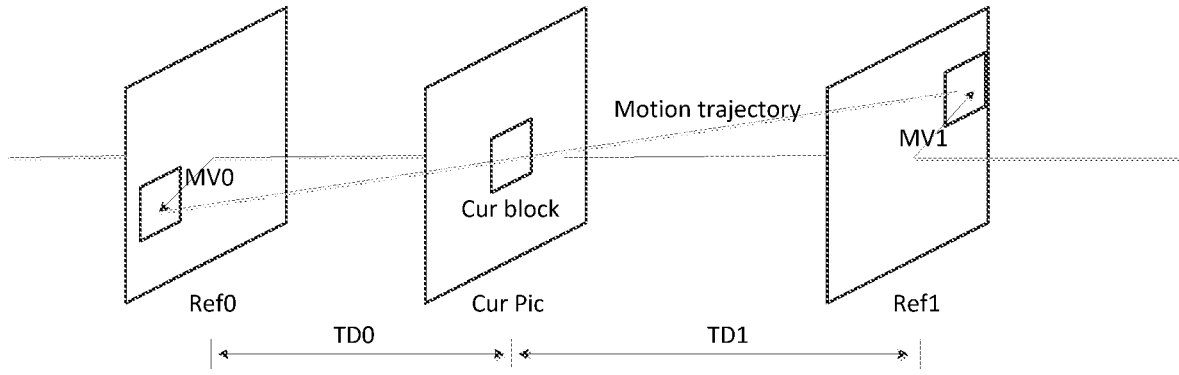
FIG. 3 illustrates the process of finding a match between two blocks along the motion trajectory of a current CU in two different reference pictures.

As shown in the FIG. 3, the bilateral matching cost function is used to derive motion information of the current CU by finding the best match between two blocks along the motion trajectory of the current CU in two different reference pictures. Under the assumption of continuous motion trajectory, the motion vectors MV0 and MV1 pointing to the two reference blocks shall be proportional to the temporal distances between the current picture and the two reference pictures (TD0 and TD1).

Figure 4:
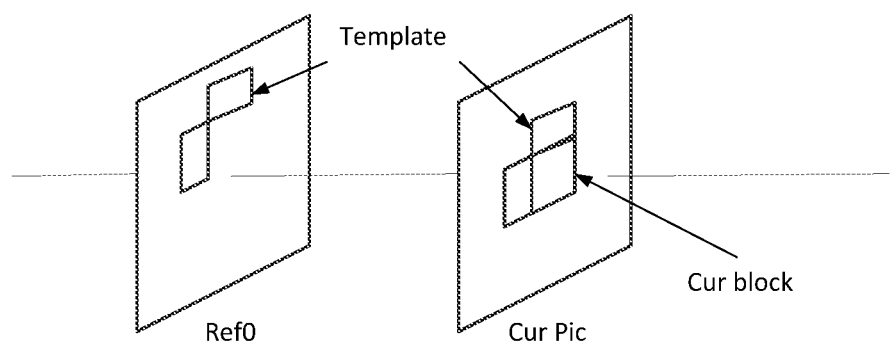
FIG. 4 illustrates the process of finding a match between a template in a current picture and the corresponding template.

As shown in FIG. 4, template matching cost function is used to derive motion information of the current CU by finding the best match between a template (top and/or left neighboring blocks of the current CU) in the current picture and a corresponding template (same size as the template) in a reference picture.

Note that this FRUC mode using the template matching cost function is also applied to AMVP (Advanced Motion Vector Prediction) mode. In this case, AMVP has two candidates. A new candidate is derived using the FRUC tool with the template matching. If this FRUC candidate is different from the first existing AMVP candidates, it is inserted at the very beginning of the AMVP candidate list and then the list size is set to two (meaning remove the second existing AMVP candidate). When applied to AMVP mode, only CU level search is applied.

Figure 5:
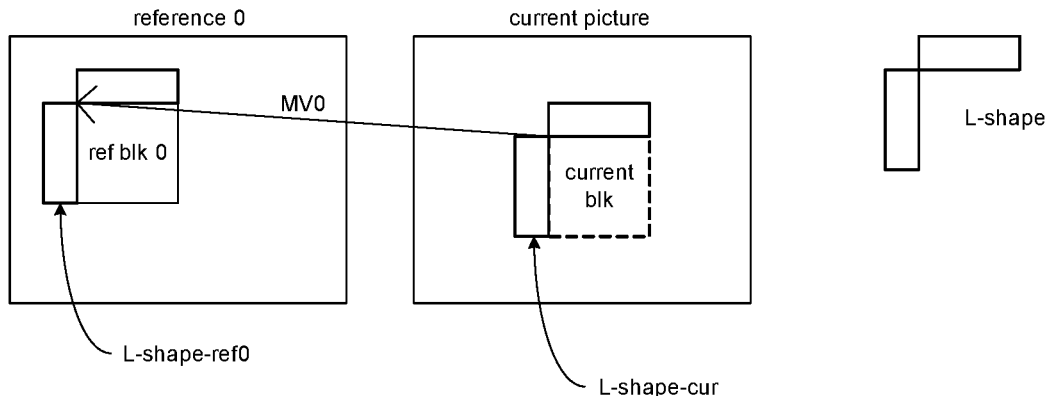
FIG. 5 illustrates the process of deriving illumination compensation parameters by comparing a L-shape located in a current picture to a corresponding L-shape in a reference picture.

In Inter mode, IC (Illumination Compensation) allows correcting block prediction samples obtained via Motion Compensation (MC) by considering the spatial or temporal local illumination variation. The IC parameters are estimated by comparing the set S of reconstructed neighboring samples (L-shape-cur) with the neighboring samples (L-shape-ref-i) of the reference-i block (i=0 or 1) as depicted in FIG. 5.

The IC parameters minimize the difference (least squares method) between the samples in the L-shape-cur and the samples of the L-shape-ref-i corrected with IC parameters. Typically, the IC model is linear: $IC(x)=a \cdot x+b$, where x is the value of the sample to compensate.

The parameters a and b are derived by resolving a least square minimization on the L-shapes at the encoder (and at the decoder):

$$(a_i, b_i) = \underset{(a,b)}{\text{argmin}}\left(\sum_{\substack{x \in L\text{-}shape\text{-}cur, \\ y \in L\text{-}shape\text{-}ref\text{-}i}} (x - a \cdot y - b)^2\right) \quad (2)$$

Finally, $a_i$ is transformed into integer weight $(a_i)$ and shift $(sh_i)$ and the MC block is corrected by IC:

$$Pred_i = (a_i * x_i >> sh_i) + b_i \quad (3)$$

A problem solved by at least one embodiment is how to limit the data dependencies outside a given block size.

Figure 6:
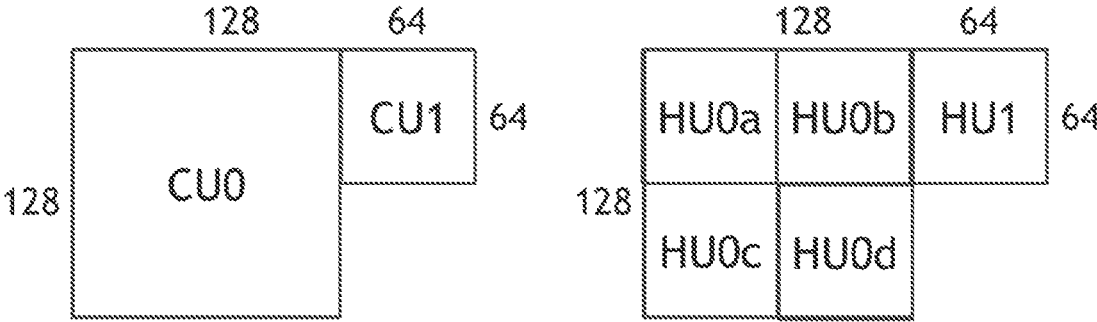
FIG. 6 depicts two Coding Units and the spatially corresponding Hardware Units according to a general aspect of at least one embodiment.

FIG. 6 depicts an example of possible processing on a hardware decoder. In this example, we assume that the maximum size of a Hardware Unit (HU) that a decoder can handle (typically set by the maximum transform of the codec) is 64 pixels. In order to increase parallelism, a decoder will split CU greater than 64 pixels into block of maximum size of 64 before sending them to computational module (typically motion compensation and residual computation).

Figure 7:
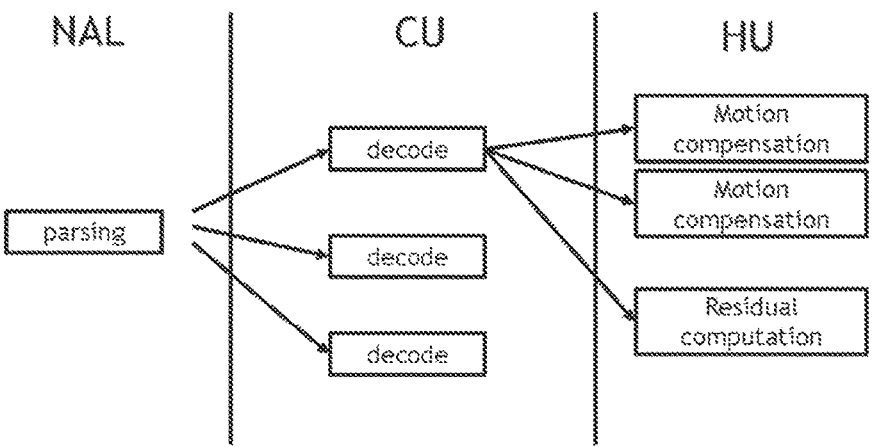
FIG. 7 illustrates the granularity of the processing at each stage of the whole decoding process according to a general aspect of at least one embodiment.

FIG. 7 depicts an example of granularity (implying a possible parallelism) at each stage of the whole decoding process. At first, the bitstream is parsed and generate a set of CU to decode. Each CU is decoded, giving the final values used to compute the reconstructed samples. Note that some causal dependencies can exist between the CU decoding (typically the value of a motion vector can be predicted from the value of already decoded (but not reconstructed) CU). Then the CU is split into several HU if necessary (depending on the size). At this point, all computation inside a HU should be done independently of others HU. Note that for intra CU, there still exist a causal dependency between reconstructed CU because the intra prediction process needs to access neighboring samples during the prediction stage.

Figure 8:
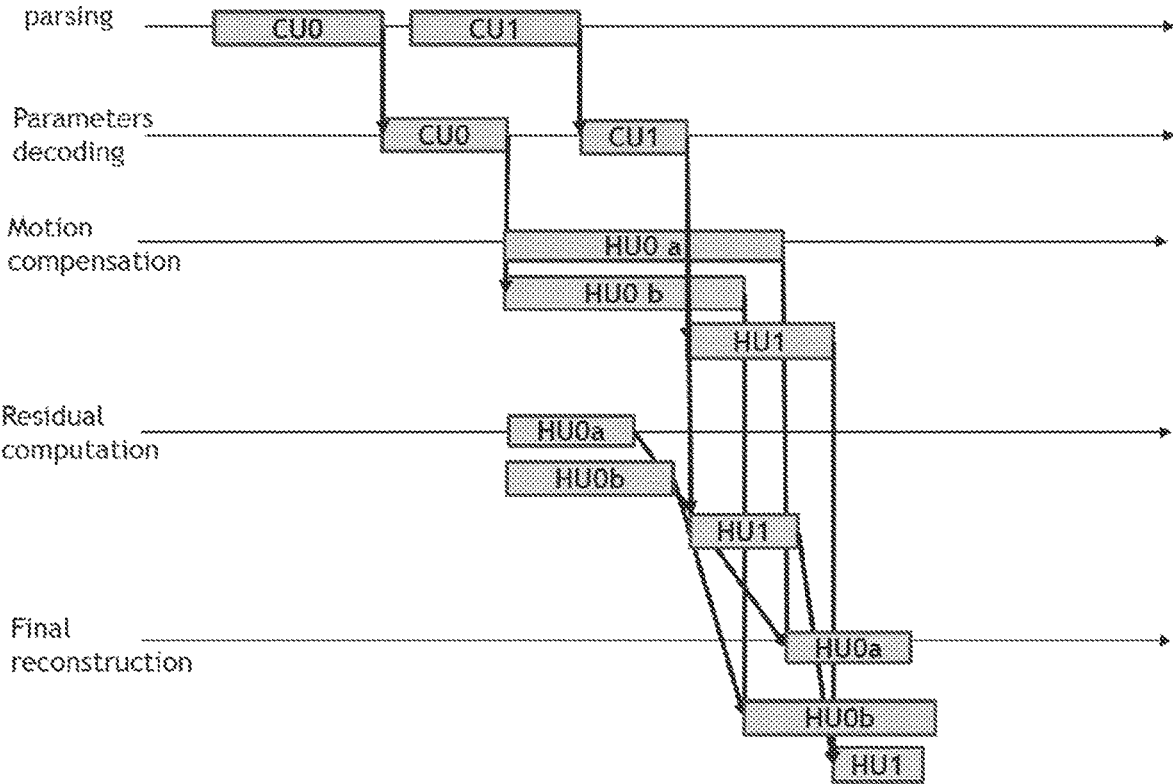
FIG. 8 depicts an example of processing pipeline for decoding an inter frame according to a general aspect of at least one embodiment.

A problem solved by at least one embodiment is how to relax the data dependency created by tools such as FRUC. FIG. 8 depicts an example of processing pipeline for decoding an inter frame. One issue arising with tools such as FRUC or LIC (Local Illumination Compensation) when considering this kind of pipeline is that it introduces data dependency on reconstructed samples of previous CU, hence breaking the possible parallelism of the HU processing.

At least one of the embodiments described here are methods to avoid this dependency and allowing highly parallel pipeline at the decoder.

FRUC, DMVR (Decoder Motion Vector Refinement) and LIC are new modes in the JEM and so pipeline stalling is a relatively new problem.

Figure 9:
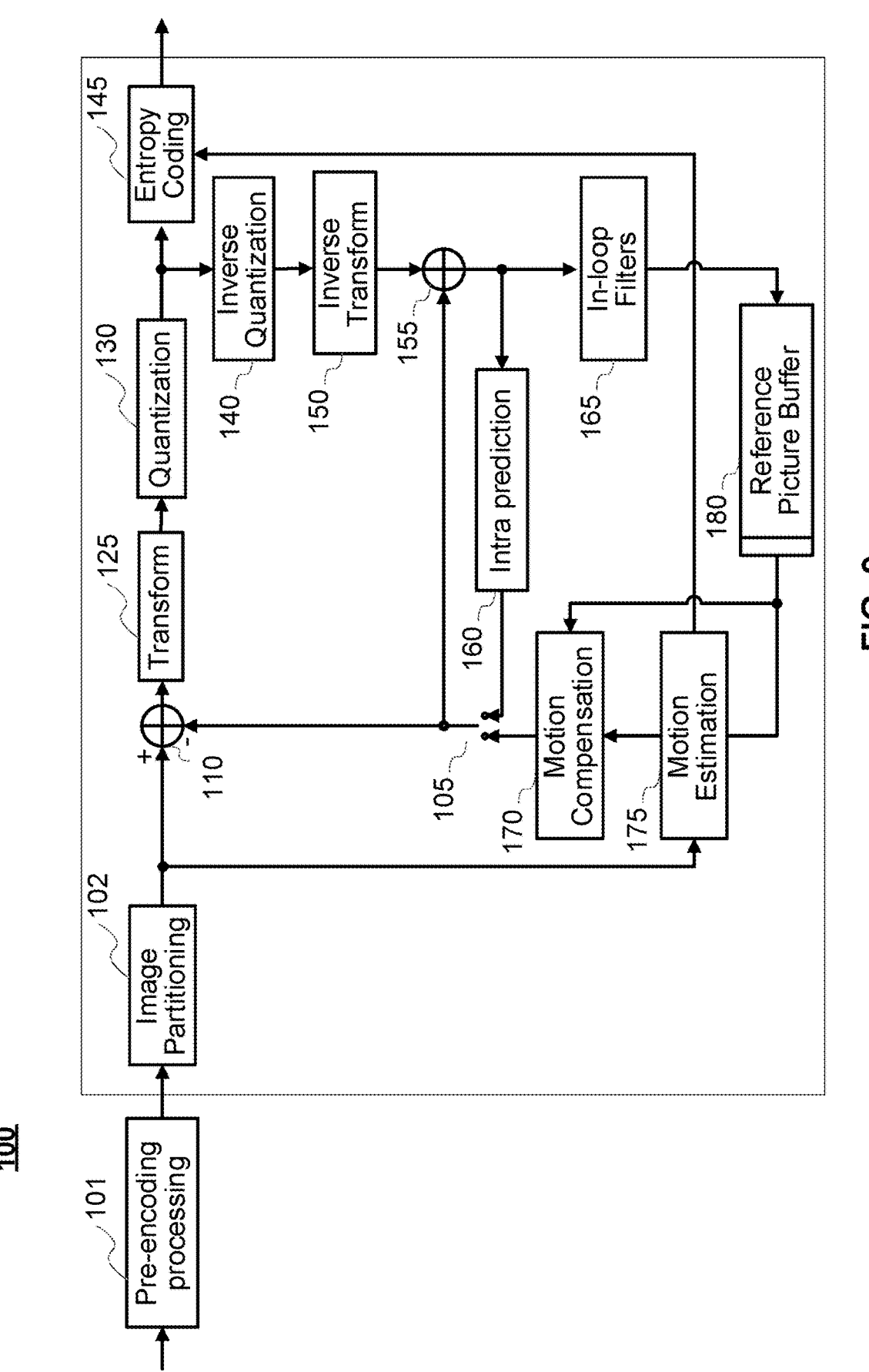
FIG. 9 illustrates a block diagram of an embodiment of a video encoder.

The basic idea of at least one embodiment is to break the dependency at HU level. At least one of the proposed embodiments involve normative modifications of the codec: encoding and decoding processes are completely symmetric. The impacted codec modules of one or more embodiments are the module 170 and possibly 160 of FIGS. 9 and 275 possibly 260 of FIG. 10.

We call Tdep the set of tools using reconstructed samples from previous CU, i.e. CU coded prior to a current CU, or using CU larger than HU at decoder side, typically:

FRUC in template mode can use reconstructed samples outside the current CU;

LIC can use reconstructed samples outside the current CU;

DMVR can use CU larger than the HU size;

BIO (BI-directional Optical flow) can use CU larger than the HU size.

FIG. 22 depicts a flowchart of a decoding method according to one embodiment. The method starts at S10. A flag is decoded (S12). The flag indicates whether a current block of a picture is decoded with a tool of a set of tools (Tdep). The flag is only decoded in the case where the current block has a parent hardware unit. The set of tools comprises tools using reconstructed samples of neighboring blocks decoded prior to the current block or using a block of said picture larger than a hardware unit. The current block is decoded (S14) responsive to the flag. The method ends at S16.

FIG. 23 depicts a flowchart of an encoding method according to one embodiment. The method starts at S20. A flag is encoded (S22). The flag indicates whether a current block of a picture is encoded with a tool of a set of tools (Tdep). The flag is only encoded in the case where the current block has a parent hardware unit. The set of tools comprises tools using reconstructed samples of neighboring blocks encoded prior to the current block or using a block of said picture larger than a hardware unit. The current block is encoded (S24) responsive to the flag. The method ends at S26.

HU Restriction

In order to be able to use an independent HU based processing, new constraints are added for the use of a tool in Tdep tools:

1. Current CU has a parent HU.
2. Left and top neighboring CUs are inside the parent HU of the current CU.

Figure 11:
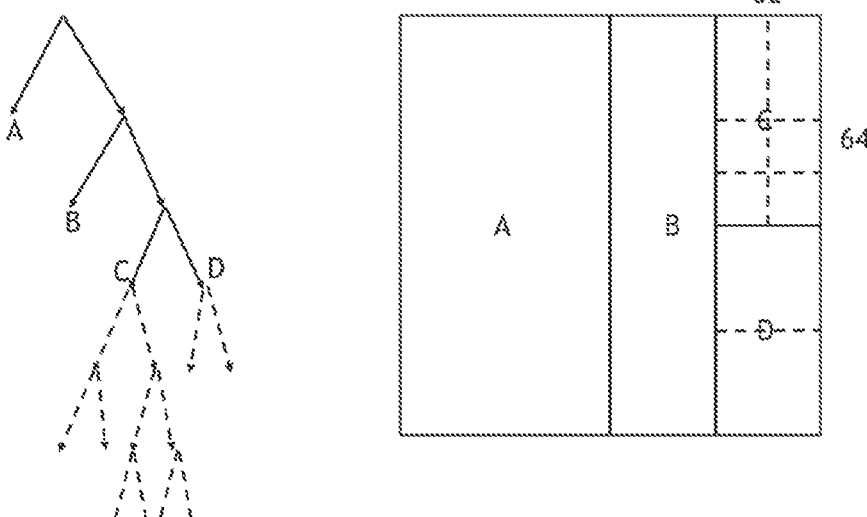
FIG. 11 depicts an example of split tree and associated split CTU.

FIG. 11 depicts an example of split tree and associated split CTU. The parent HU of a CU is defined as the first CU in the split tree with a size (width and height) less or equal to S. As an example, S=64. For example, in the FIG. 11, C and D are parent HU.

Figure 12:
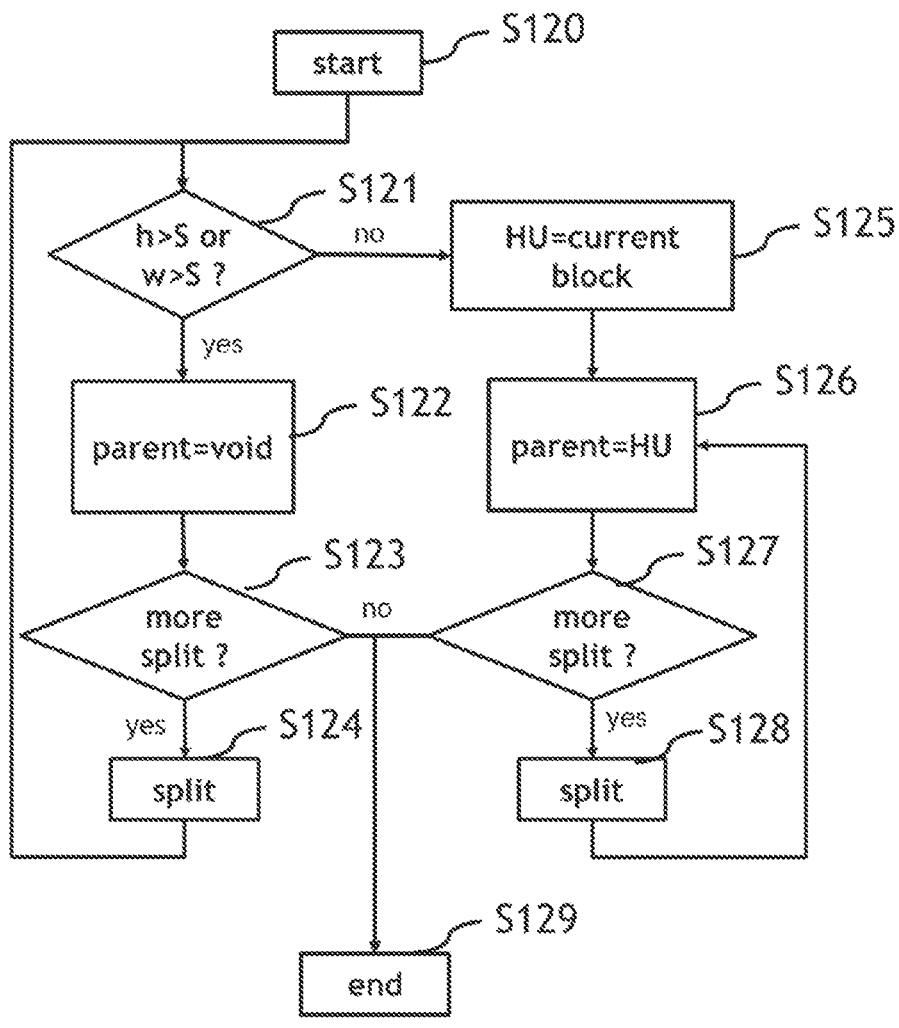
FIG. 12 illustrates a process for determining a parent Hardware Unit (HU) according to a general aspect of at least one embodiment.

FIG. 12 depicts a process for determining the parent HU of a block, e.g. a CU. The process starts at step S120. At step S121, it is checked whether h or w are larger than S, where h and w are the height and the width respectively of the current block. In the case where h>S or w>S, then the process continues at step S122, otherwise the process continues at step S125.

At S122, the current block has no parent HU.

At step S123, it is checked whether the current block is further split into child blocks. If not, then the process ends (S129). If yes, then the current block is further split (S124) into child blocks and the process continues for the child blocks at S121.

If yes, then the process continues at S124, otherwise the process ends (S129).

At S125, the HU is set equal to the current block (such as for example Block C for its child blocks).

At S126, the current block's parent HU is the HU.

Figure 13:
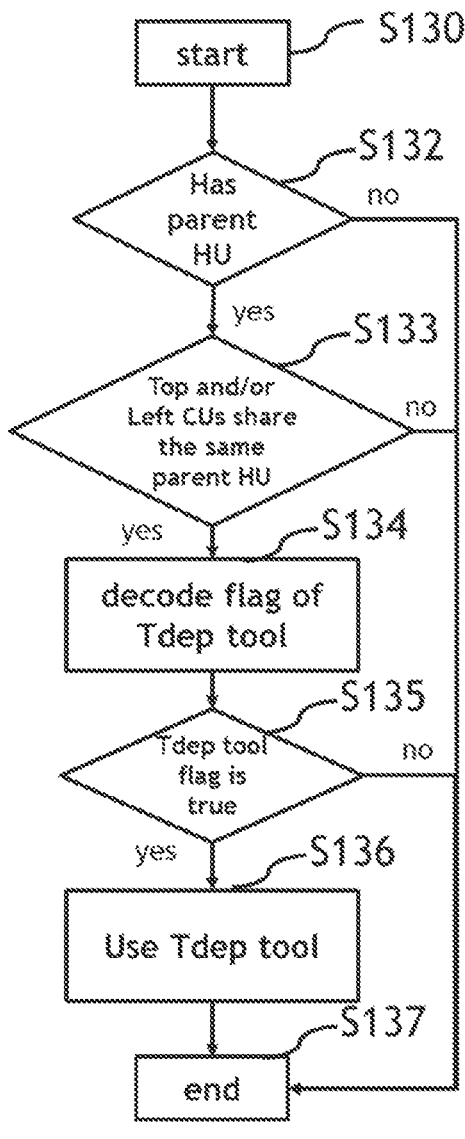
FIG. 13 illustrates a process for deciding whether to activate a tool in Tdep according to a general aspect of at least one embodiment.

At S127, it is checked whether the current block is further split. If not, then the process ends (S129). If yes, then the current block is further split (S128) and the process continues for the child blocks at S126. margin The second criteria checks if a neighboring CU of a current CU shares the same parent HU as the current CU. FIG. 13 depicts the flowchart of a process to decide to use or not a tool in Tdep tools.

The process starts at S130.

At step S132, it is checked whether the current CU has a parent HU such as depicted on FIG. 12. If no, then the process ends at S137 (Tdep tool is not used). Otherwise, the process continues at S133, it is checked whether the neighboring CUs (e.g. top and left) share the same parent HU as the current CU. If not, then the process ends. Otherwise the process continues at S134.

At S134, a flag indicating whether Tdep tool is used or not is decoded. In the case where, the flag is true (S135), then the corresponding tool is used (S136) for decoding the current CU. If not then the process ends (S137), i.e. the corresponding Tdep tool is not used.

Figure 14:
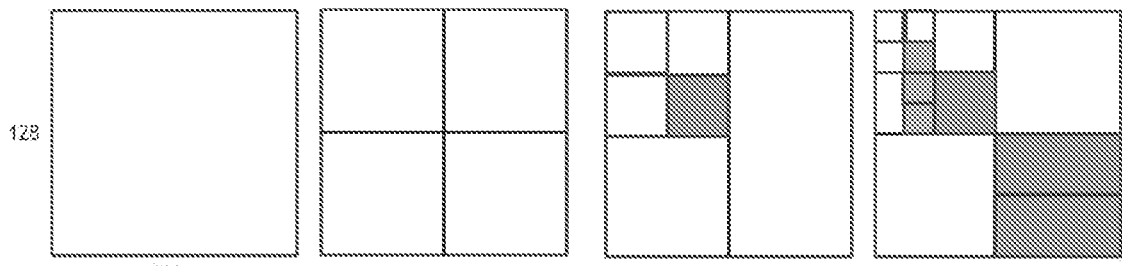
FIG. 14 depicts in grey CUs for which Tdep tools can be used according to a general aspect of at least one embodiment.
Figure 15:
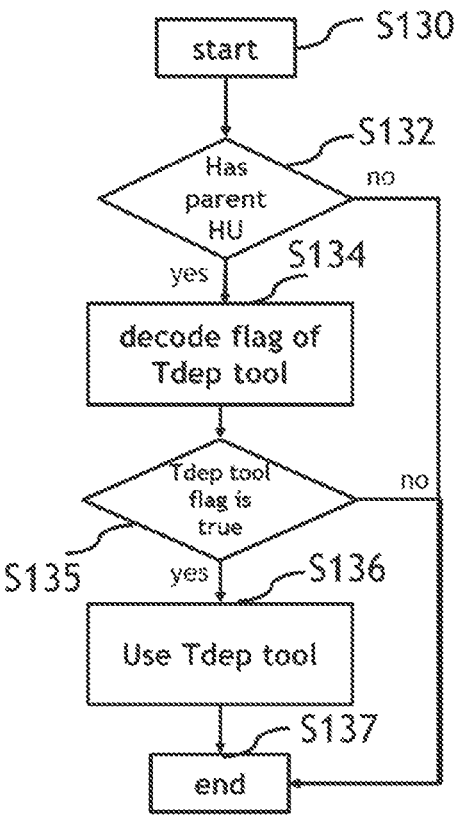
FIG. 15 illustrates a process for parsing a flag according to a general aspect of at least one embodiment.

FIG. 14 shows some examples of CUs for which Tdep tools can be used (in grey). The HU size is set to 64. In one embodiment, the parsing of the flag of a tool in Tdep tool is constrained by the process described in FIG. 13. In one embodiment, the decoding of the flag of a tool in Tdep tool is constrained only by existence of a parent HU as shown in FIG. 15.

The process starts (S130). It is checked whether the current CU has a parent HU (S132). In the case where, the flag is true (S135), then the corresponding tool is used (S136) for decoding the current CU. If not, then the process ends (S137), i.e. the corresponding Tdep tool is not used.

Motion Vector Propagation the HU

Since the reconstruction of the CUs inside a HU are independent, the prediction of values between HU can also be restricted.

Here are examples of values generated by tools in Tdep set:

FRUC: the final value of the motion vector of a CU is given after the final motion refinement.

Figure 16:
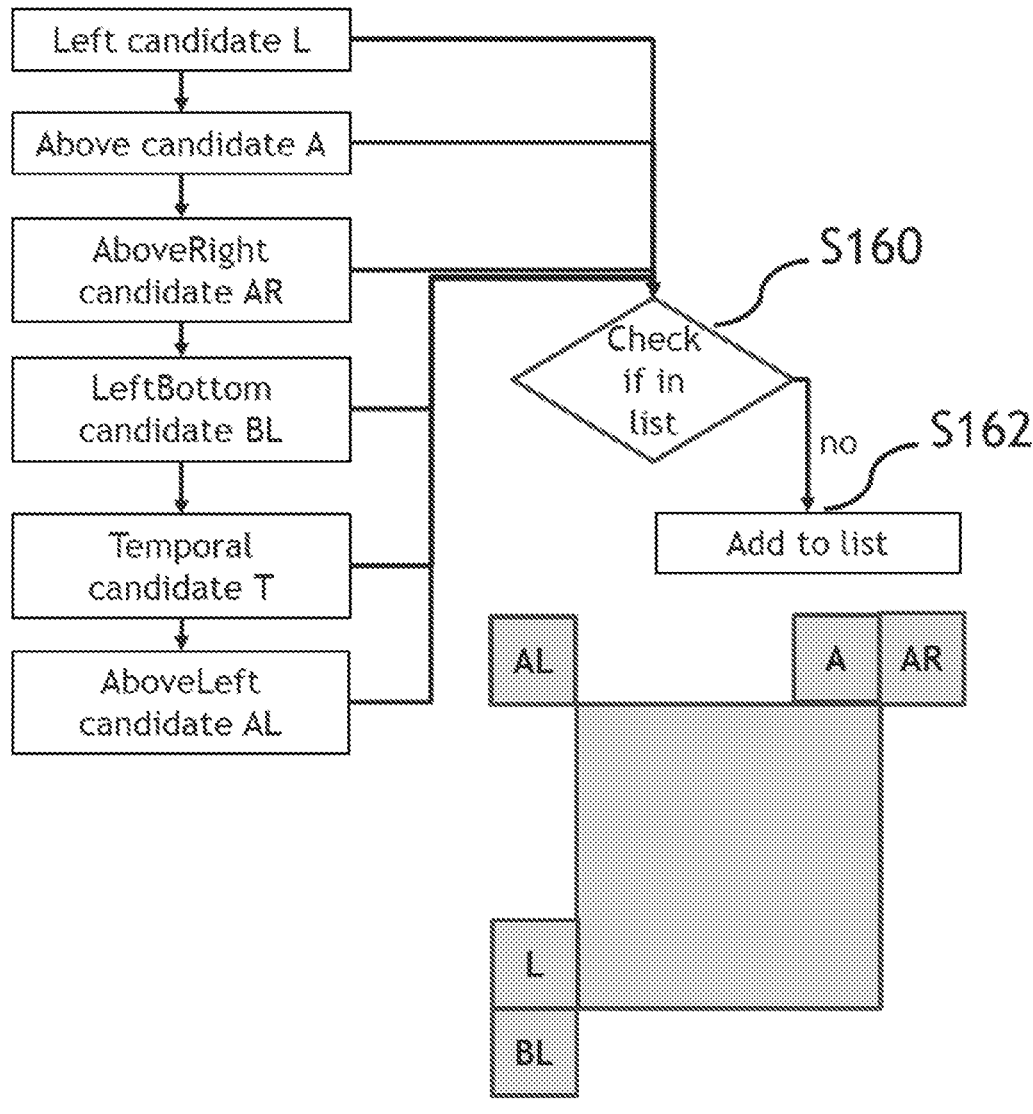
FIG. 16 illustrates motion vector predictor derivation for merge candidates.

DMVR: the final value of the motion vector of a CU is given after the final motion refinement The values generated can then be used as a prediction for further CUs (FIG. 16 for an example of predicted values). At S160 it is checked whether a given motion predictor is in the list of motion vector candidates. If not, it is added to the list (S162).

Figure 17:
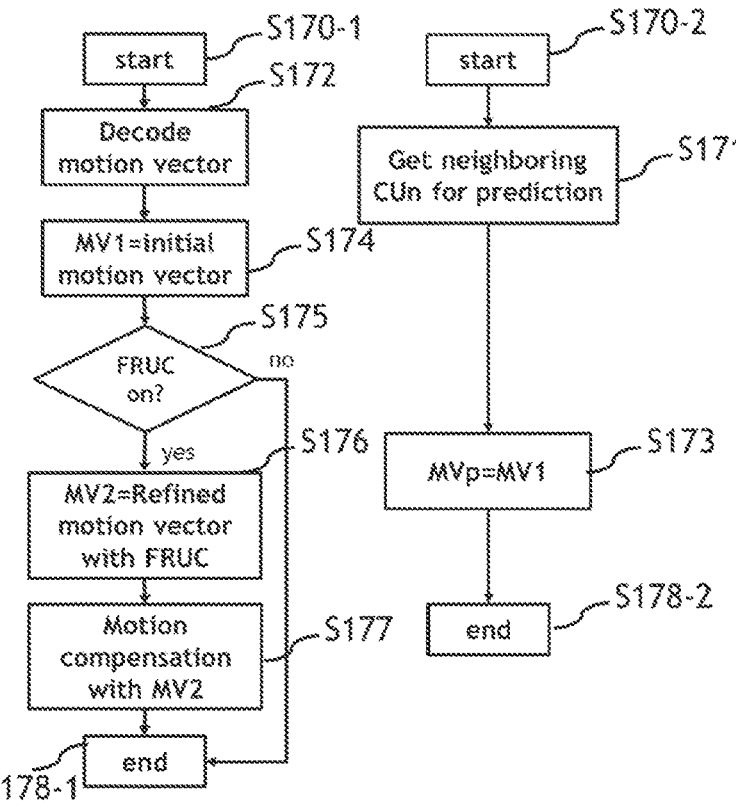
FIG. 17 illustrates the process of motion vector update for a CU (on the left) and of motion predictor derivation (on the right) according to a general aspect of at least one embodiment.

For tools generating new motion vector for a CU, the motion vector prediction can also be constrained inside a HU. In this embodiment, the predictor used by a CU is always the value before the motion refinement, i.e. the final motion vector is not updated for blocks having decoder side motion vector derivation tools (FRUC, DMVR etc.). From S170-1 to S178-1, a CU refines, depending on the FRUC flag, a motion vector candidate for its own motion compensation. However, it uses the non-refined motion vector (S170-2 to S178-2) of a neighboring CU as a predictor. FIG. 17 shows a process of motion vector update for the current CU (left) and motion predictor derivation (right).

The motion vector update process starts at S170-1. At S172, a MV candidate is decoded.

At S174, MV1 is set equal to the decoded MV candidate.

At S175, it is checked whether FRUC is used (flag is true). If yes, then motion vector MV1 is refined with FRUC to obtain MV2 (S176). The current CU is motion compensated with MV2 (S177)

The process ends (S178-1).

The motion predictor derivation process starts as at S170-2. A neighboring CU denoted CUn is considered for prediction (S171). Motion vector predictor used in S172 is set equal to MV1 and not to the refined vector of the neighboring CU.

Propagation Only for CU Inside the Same HU

Figure 18:
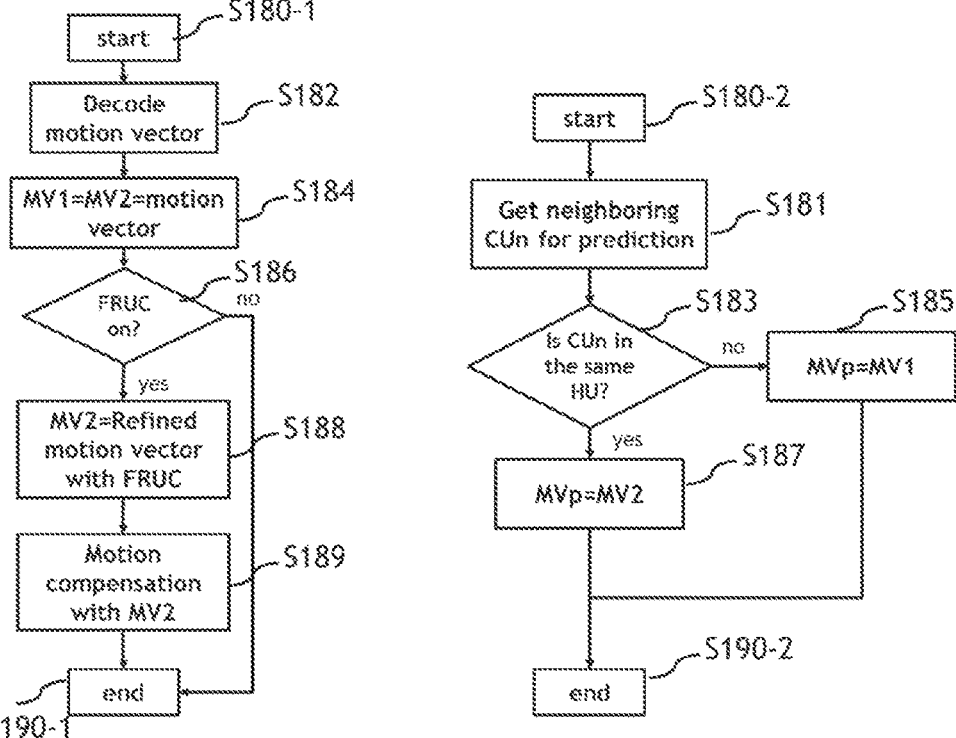
FIG. 18 illustrates the process of motion vector update for a CU (left) and motion predictor derivation depending on the HU (on the right) according to a general aspect of at least one embodiment.

The FIG. 18 illustrates the process of motion vector update for a CU (left) and motion predictor derivation depending on the HU (on the right) according to a general aspect of at least one embodiment. From S180-1 to S190-1, a CU refines, depending on the FRUC flag, a motion vector candidate.

However, it uses the non-refined motion vector (S185) of a neighboring CU as a predictor in case the neighboring CU are outside the HU (S183) of the current CU, and the refined motion vector (S187) if they are in the same HU.

The process of motion vector update starts at S180-1. A S182, a MV candidate is decoded. At S184, MV1 and MV2 are set to the decoded motion vector candidate.

At S186, it is checked whether FRUC is used (flag is true). If yes, then motion vector MV1 is refined with FRUC to obtain MV2 (S188). The current CU is motion compensated with MV2 (S189)

The process ends (S190-1).

The motion predictor derivation process starts as at S180-2. A neighboring CU denoted CUn is considered for prediction (S181). It is checked whether CUn is in the same HU than the current CU. If yes, then the refined motion vector is used for prediction (S187). If not, the non refined motion vector is used (S185). The method ends at S190-2.

In this embodiment, the motion vector predictor used depends on the parent HU of the CU.

An associated syntax on the size of a HU and/or on the constraints for value propagation, such as one or more flags, selections from lists, other indicators, for example, on the limitation of FRUC or IC can be signaled at, for example, one or more of the slice, PPS (Picture Parameter Set), or SPS (Sequence Parameter Set) levels. Other levels, high-level syntax or otherwise, are used in other embodiments. Associated syntax that is used for this signaling includes, for example, one or more flags, selections from lists, other indicators.

Multi-HU Independent Computation Per CU

As depicted in FIG. 6, a CU can be split into several HUs for computation. In this case, a single syntax element is signaled at CU level but the processing is done per HU. Note that the computation can then lead to different results inside the CU. Example of tools affected by this processing are:

DMVR;

LIC in bidirectional mode.

In this case, the processing (for example bilateral motion vector refinement of DMVR, or Illumination compensation parameters bi-directional) will be done independently for each HU.

Figure 19:
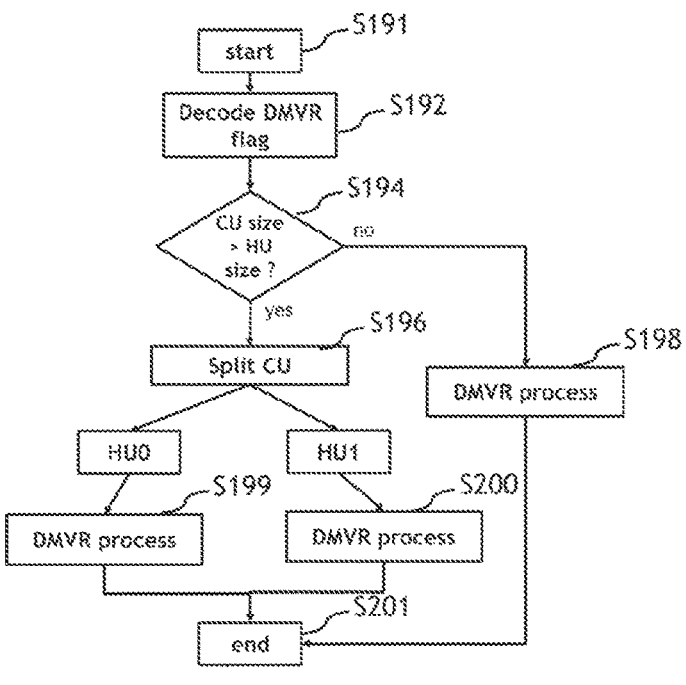
FIG. 19 illustrates the process of splitting a CU into 2 HUs according to a general aspect of at least one embodiment.

FIG. 19 shows an example where a CU is split into 2 HUs: a unique flag is parsed and decoded for the CU, then, if the CU size is greater than HU size, each sub HU run an independent DMVR processing.

From S191 to S201, a CU using DMVR mode is split into several HU if the CU size is greater than the HU size. The generated HU then uses an independent DMVR process (S199 and S200).

The process starts at S191. A flag is decoded (S192) that indicates whether DMVR applies. If DMVR applies, then it is checked (S194) if CU size is larger than HU size. If not, then DMVR applies on the CU (S198). If yes, the CU is split (S196) into smaller hardware units (also called sub-HU) HU0 and HU1. The CU can be split into more than two sub-HUs as depicted on FIG. 20. Each sub HU run an independent DMVR processing (S199 and S200). The process ends at S201.

HU Splitting

Figure 20:
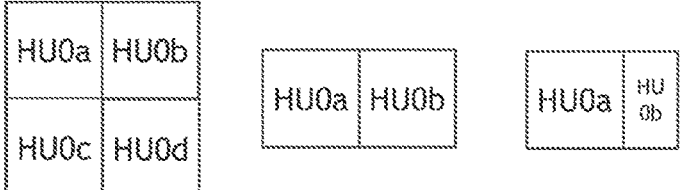
FIG. 20 depicts an example of splitting a CU according to a general aspect of at least one embodiment.

The splitting of CU into sub-HUs can be done several ways:

Split by maximum HU size (both horizontally and vertically) and if the last HUs (horizontally and/or vertically) are outside the CU, adapt their size (FIG. 20)

Split the CU to have an equal number of HU horizontally and vertically, given the constraints that each HU should not be greater in size that the maximum size and should also be a multiple of 4 (minimum CU size)

Various embodiments include one or more of the following:

Limiting the usage of tools in Tdep at HU level+additional constraints on the causal border of the HU.

Adapting the syntax to these constraints

Several variant of HU topology on the frame.

adapting the signaling and HU processing of some tools (DMVR, LIC bidir)

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 10:
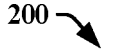
FIG. 10 illustrates a block diagram of an embodiment of a video decoder.
Figure 10:
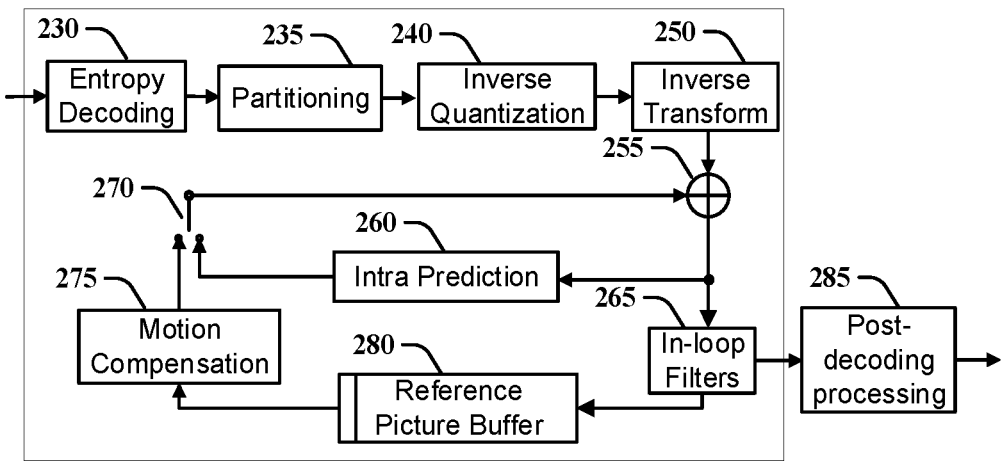
Figure 21:
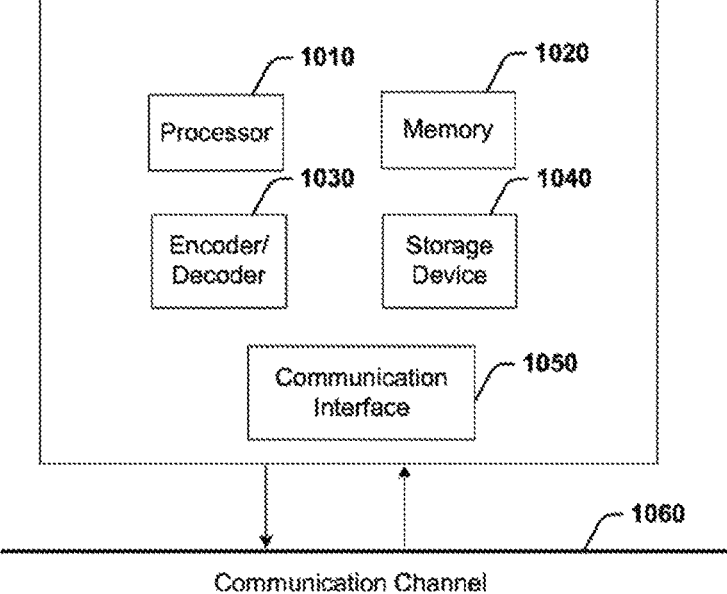
FIG. 21 illustrates a block diagram of a system within which aspects of the present embodiments can be implemented.

The aspects described and contemplated in this document can be implemented in many different forms. FIGS. 10, 11 and 21 below provide some embodiments, but other embodiments are contemplated and the discussion of FIGS. 10, 11 and 21 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described above, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, such as, for example, the motion compensation and possibly intra prediction modules (170, 275, 160, 260), of a JVET or HEVC encoder 100 and decoder 200 as shown in FIG. 10 and FIG. 11. Moreover, the present aspects are not limited to JVET or HEVC, and can be applied, for example, to other standards and recommendations, whether pre-existing or future-developed, and extensions of any such standards and recommendations (including JVET and HEVC). Unless indicated otherwise, or technically precluded, the aspects described in this document can be used individually or in combination. Various numeric values may be shown in the present document. The specific values are for exemplary purposes and the aspects described are not limited to these specific values.

FIG. 10 illustrates an exemplary encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the exemplary encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of an exemplary video decoder 200. In the exemplary decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101).

The post-decoding processing can use metadata derived in the pre-encoding processing and signaled in the bitstream.

FIG. 21 illustrates a block diagram of an exemplary system in which various aspects and exemplary embodiments are implemented. System 1000 can be embodied as a device including the various components described below and is configured to perform one or more of the aspects described in this document. Examples of such devices, include, but are not limited to, personal computers, laptop computers, smartphones, tablet computers, digital multimedia set top boxes, digital television receivers, personal video recording systems, connected home appliances, and servers. System 1000 can be communicatively coupled to other similar systems, and to a display via a communication channel as shown in FIG. 21 and as known by those skilled in the art to implement the various aspects described in this document.

The system 1000 can include at least one processor 1010 configured to execute instructions loaded therein for implementing the various aspects described in this document. Processor 1010 can include embedded memory, input output interface, and various other circuitries as known in the art. The system 1000 can include at least one memory 1020 (e.g., a volatile memory device, a non-volatile memory device). System 1000 can include a storage device 1040, which can include non-volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples. System 1000 can include an encoder/decoder module 1030 configured to process data to provide an encoded video or decoded video, and the encoder/decoder module 1030 can include its own processor and memory.

Encoder/decoder module 1030 represents the module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processors 1010 as a combination of hardware and software as known to those skilled in the art.

Program code to be loaded onto processors 1010 to perform the various aspects described in this document can be stored in storage device 1040 and subsequently loaded onto memory 1020 for execution by processors 1010. In accordance with the exemplary embodiments, one or more of the processor(s) 1010, memory 1020, storage device 1040, and encoder/decoder module 1030 can store one or more of the various items during the performance of the processes described in this document, including, but not limited to the input video, the decoded video, the bitstream, equations, formulas, matrices, variables, operations, and operational logic.

The system 1000 can include communication interface 1050 that enables communication with other devices via communication channel 1060. The communication interface 1050 can include, but is not limited to, a transceiver configured to transmit and receive data from communication channel 1060. The communication interface 1050 can include, but is not limited to, a modem or network card and the communication channel can be implemented within a wired and/or a wireless medium. The various components of system 1000 can all be connected or communicatively coupled together using various suitable connections, including, but not limited to internal buses, wires, and printed circuit boards.

The exemplary embodiments can be carried out by computer software implemented by the processor 1010 or by hardware, or by a combination of hardware and software. As a non-limiting example, the exemplary embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized inventions and claims, including all combinations, across various different claim categories and types:

Relaxing, reducing, or otherwise modifying data dependency created by coding and/or decoding tools:
Wherein the tools include FRUC, DMVR, LIC, BIO
Wherein the data dependency is a dependency between a block (current block) being decoded and a neighboring block, e.g. CU.
Limiting use of some tools at HU level, wherein the tools include FRUC, DMVR, LIC, BIO
Limiting use of some tools at HU level based on neighboring block.
Using some of the tools in the case where at least one neighboring block (e.g. top and/or left neighboring block) share the same parent HU as current block.
The neighboring block are top and left block of current block.
Adapting HU processing of some tools, e.g. DMVR and LIC bidir.
Restricting prediction values between HUs.
A bitstream or signal that includes one or more of the described syntax elements, or variations thereof.
Inserting in the signaling syntax elements that enable the decoder to process a bitstream in a manner corresponding to that used by an encoder.
Creating and/or transmitting and/or receiving and/or decoding a bitstream or signal that includes one or more of the described syntax elements, or variations thereof.
A TV, set-top box, cell phone, tablet, or other electronic device that performs any of the embodiments described.
A TV, set-top box, cell phone, tablet, or other electronic device that performs any of the embodiments described, and that displays (e.g. using a monitor, screen, or other type of display) a resulting image.
A TV, set-top box, cell phone, tablet, or other electronic device that tunes (e.g. using a tuner) a channel to receive a signal including an encoded image, and performs any of the embodiments described.
A TV, set-top box, cell phone, tablet, or other electronic device that receives (e.g. using an antenna) a signal over the air that includes an encoded image, and performs any of the embodiments described.

Various other generalized, as well as particularized, inventions and claims are also supported and contemplated throughout this disclosure.

A decoding method is disclosed that comprises:
decoding a flag indicating whether a current block of a picture is decoded with a tool of a set of tools only in the case where the current block has a parent hardware unit, the set of tools comprising tools using reconstructed samples of neighboring blocks decoded prior to the current block or using a block of the picture larger than a hardware unit; and
decoding the current block responsive to the flag.

A decoding apparatus is disclosed that comprises at least one processor configured to perform:
decoding a flag indicating whether a current block of a picture is decoded with a tool of a set of tools only in the case where the current block has a parent hardware unit, the set of tools comprising tools using reconstructed samples of neighboring blocks decoded prior to the current block or using a block of the picture larger than a hardware unit; and
decoding the current block responsive to the flag.

An encoding method is disclosed that comprises:
encoding a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
encoding the current block responsive to the flag.

An encoding apparatus that comprises at least one processor configured to perform:
encoding a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
encoding the current block responsive to the flag.

A signal is disclosed that comprises:
a flag indicating whether a current block of a picture is encoded with a tool of a set of tools only in the case where the current block has a parent hardware unit, the set of tools comprising tools using reconstructed samples of neighboring blocks encoded prior to the current block or using a block of the picture larger than a hardware unit; and
data representative of the current block coded responsive to the flag.

A device is disclosed that comprises:
a decoding apparatus according to any of the embodiments disclosed; and
at least one of (i) an antenna configured to receive a signal over the air, the signal including the video having the image, (ii) a band limiter configured to limit the received signal to a band of frequencies that includes the video having the image, or (iii) a display configured to display the output.

A computer program product is disclosed that includes instructions which, when the program is executed by one or more processors, causes the one or more processors to carry out the decoding or encoding method of any of the embodiments disclosed.

In an embodiment, the flag is decoded (respectively encoded) only in the case where the current block has a parent hardware unit and at least one neighboring block is located inside the same parent hardware unit as the current block.

In an embodiment, the set of tools comprises the following tools: Frame Rate Up-Conversion, Local Illumination Compensation, Decoder Motion Vector Refinement and Bi-directional Optical Flow.

In an embodiment, the tool using a template, only a part of the template located inside the same parent hardware unit as the current block is used.

In an embodiment, wherein the tool using a motion vector predictor with refinement, motion vector refinement is added to motion vector predictor in the case where the current block and a neighboring block are located in the same hardware unit and wherein motion vector refinement is not added to motion vector predictor in the case where current block and neighboring block are located in different hardware units.

The invention claimed is:

1. A decoding method, comprising:
decoding, from video data, a first motion vector signaled for a first block of a picture;
refining the first motion vector to produce a second motion vector, the first block being temporally predicted from a first area of a first reference picture motion compensated using the second motion vector; and
decoding, from the video data, a second block, the second block being temporally predicted from a second area of a second reference picture motion compensated using a third motion vector, the third motion vector being computed as a sum of a predictor motion vector and a motion vector residual decoded from the video data, the predictor motion vector being the first motion vector or the second motion vector depending on whether the first block and the second block belong or not to a same set of contiguous samples.

2. The method of claim 1, wherein the third motion vector is computed at any time after the decoding of the first motion vector responsive to the predictor motion vector is the first motion vector.

3. The method of claim 1, further comprising refining the first motion vector using a bilateral matching process to produce the second motion vector.

4. A non-transitory computer readable medium for storing instructions which, when executed, perform the method of claim 1.

5. A decoding apparatus, comprising:
at least one processor configured for:
decoding, from video data, a first motion vector signaled for a first block of a picture;
refining the first motion vector to produce a second motion vector, the first block being temporally predicted from a first area of a first reference picture motion compensated using the second motion vector; and
decoding, from the video data, a second block, the second block being temporally predicted from a second area of a second reference picture motion compensated using a third motion vector, the third motion vector being computed as a sum of a predictor motion vector and a motion vector residual decoded from the video data, the predictor motion vector being the first motion vector or the second motion vector depending on whether the first block and the second block belong or not to a same set of contiguous samples.

6. The apparatus of claim 5, wherein the third motion vector is computed at any time after the first motion vector is decoded responsive to the predictor motion vector is the first motion vector.

7. An encoding method, comprising:
signaling, in video data, a first motion vector for a first block of a picture;
refining the first motion vector to produce a second motion vector, the first block being temporally predicted from a first area of a first reference picture motion compensated using the second motion vector; and
encoding, in the video data, a second block, the second block being temporally predicted from a second area of a second reference picture motion compensated using a third motion vector, the third motion vector being encoded in the video data with motion information comprising a residual motion vector corresponding to a difference between a predictor motion vector and the third motion vector, the predictor motion vector being the first motion vector or the second motion vector depending on whether the first block and the second block belong or not to a same set of contiguous samples.

8. The method of claim 7, wherein the first reference picture and the second reference picture are a same picture.

9. A non-transitory computer readable medium for storing instructions which, when executed, perform the method of claim 7.

10. An encoding apparatus, comprising:
at least one processor configured for:
signaling, in video data, a first motion vector for a first block of a picture;
refining the first motion vector to produce a second motion vector, the first block being temporally predicted from a first area of a first reference picture motion compensated using the second motion vector; and
encoding, in the video data, a second block, the second block being temporally predicted from a second area of a second reference picture motion compensated using a third motion vector, the third motion vector being encoded in the video data with motion information comprising a residual motion vector corresponding to a difference between a predictor motion vector and the third motion vector, the predictor motion vector being the first motion vector or the second motion vector depending on whether the first block and the second block belong or not to a same set of contiguous samples.

11. The apparatus of claim 10, wherein the first reference picture and the second reference picture are a same picture.

12. A non-transitory computer readable medium containing data content generated by the apparatus of claim 10.

* * * * *